UNITED STATES PATENT OFFICE.

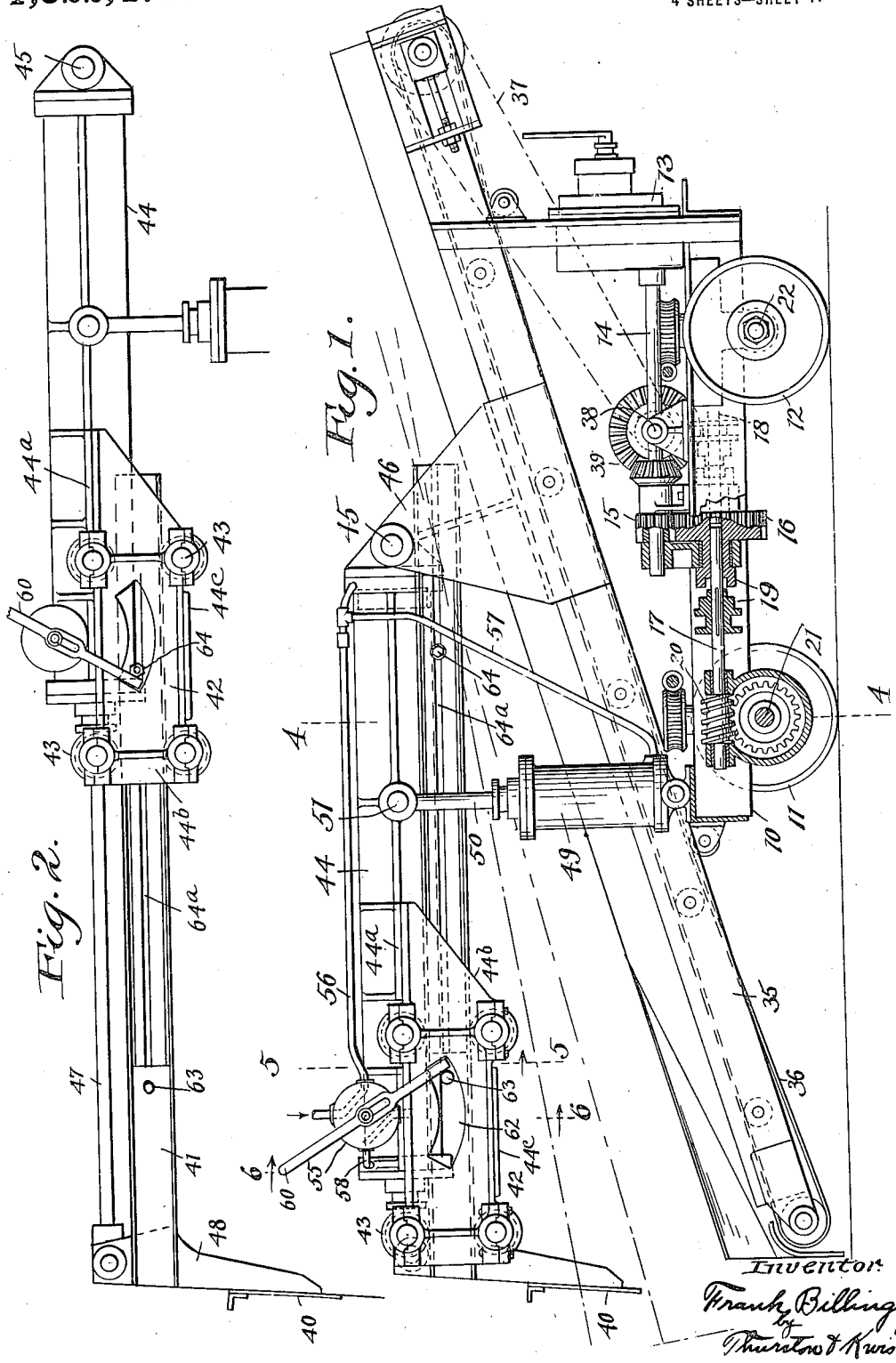

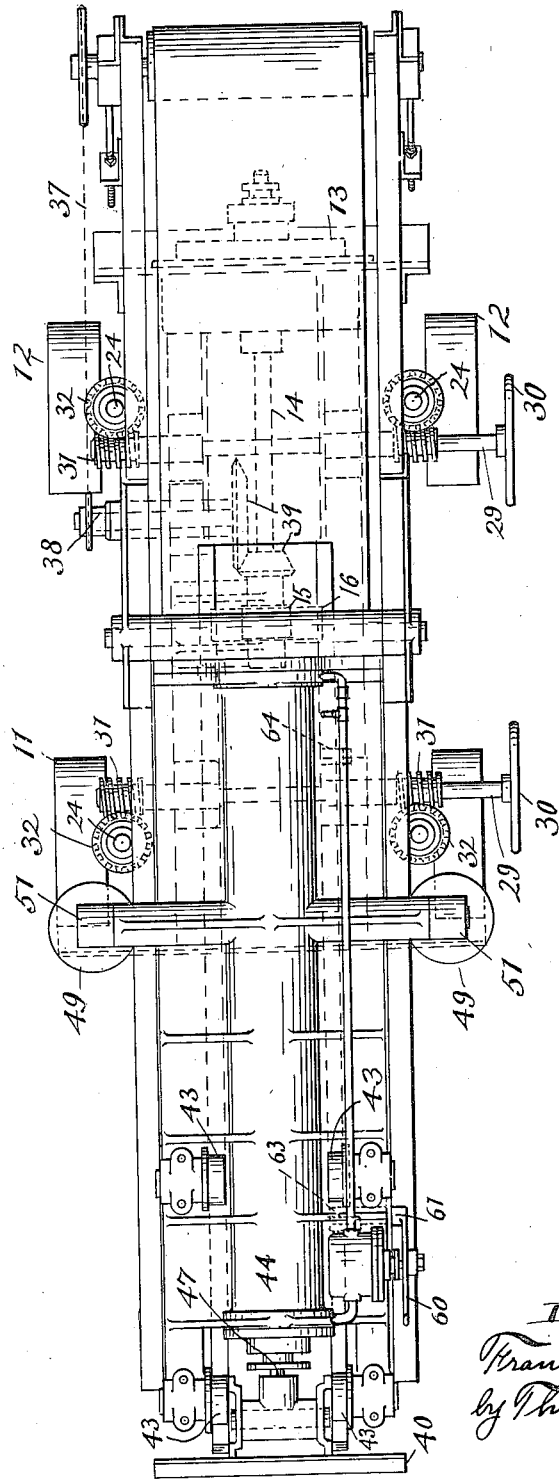

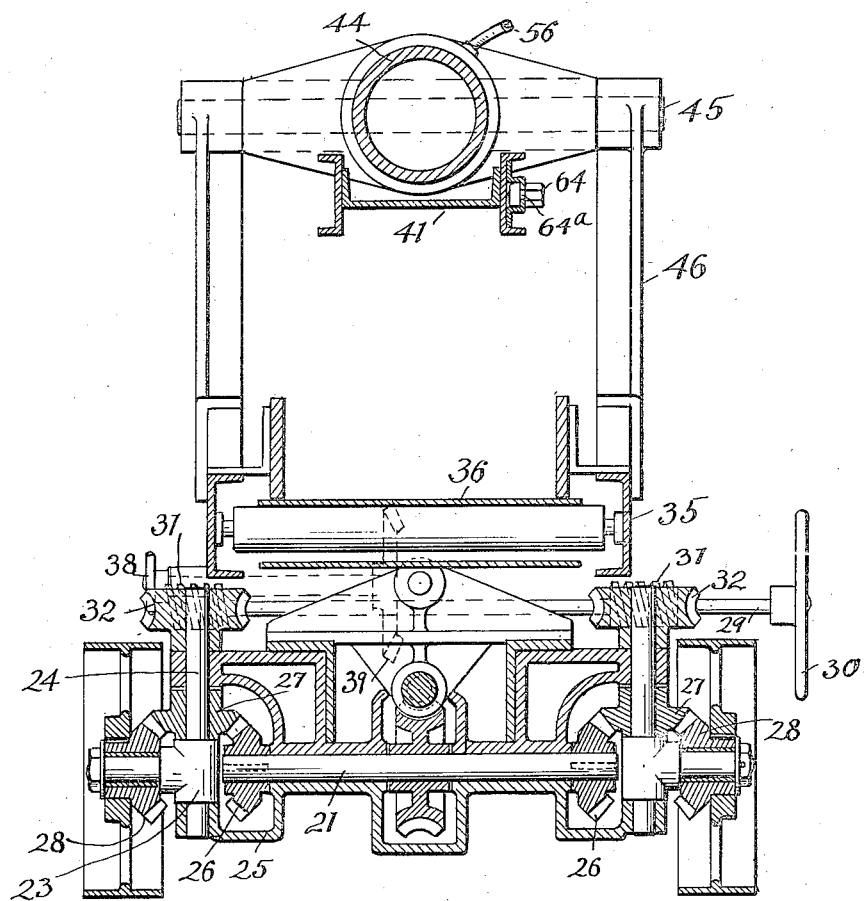
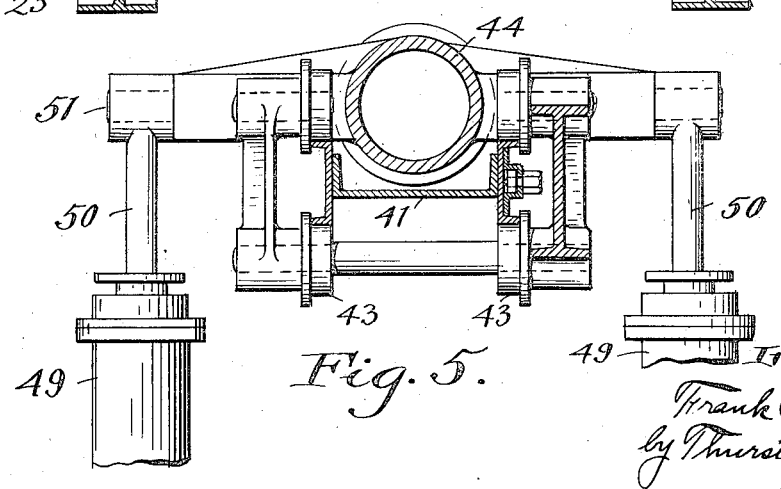

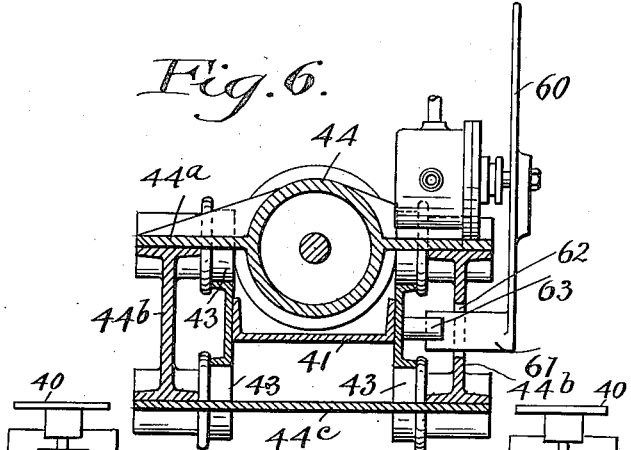
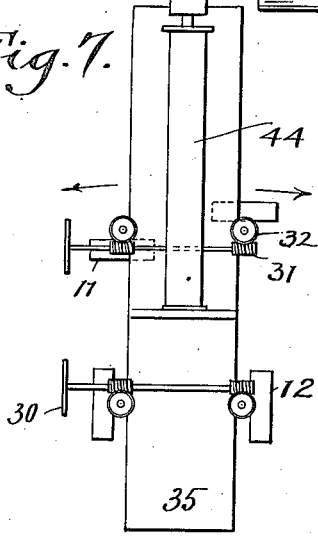
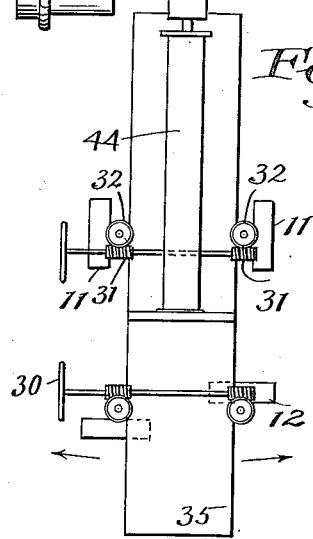
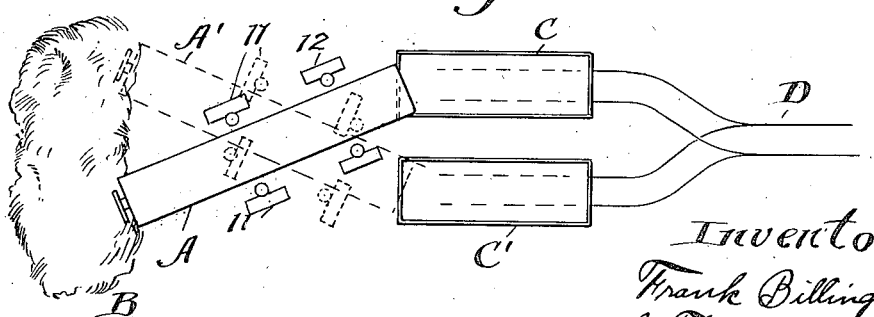

FRANK BILLINGS, OF CLEVELAND, OHIO.

LOADING-MACHINE.

1,322,475.  Specification of Letters Patent.  Patented Nov. 18, 1919.

Application filed July 14, 1916.  Serial No. 109,248.

*To all whom it may concern:*

Be it known that I, FRANK BILLINGS, a citizen of the United States, residing at Cleveland, in the county of Cuyahoga and State of Ohio, have invented a certain new and useful Improvement in Loading-Machines, of which the following is a full, clear, and exact description.

This invention relates to a loading machine adapted particularly for use in mines, and is an improvement over the construction constituting the subject matter of my prior Patent No. 1,095,786, dated May 5, 1914.

The main object of the present invention is to provide a loading or digging and loading machine which is relatively small and can be advantageously employed in small confined spaces, and which is so constructed that it can be easily and quickly moved about and brought up to, or positioned with respect to the material to be loaded in the cars, regardless of the position in which the material may be. This object is attained by providing a small, comparatively light machine which can be easily moved about and brought up to the material, instead of the larger, heavier and more cumbersome machine with a greater range or reach of the material moving tool, such as disclosed in my prior patent above referred to.

Another object is to provide a machine having means for giving to the digging and material moving member, such as a hoe on the end of a movable ram, rapid in and out movement, or combined in and out and vertical movements, together with an automatic reverse at or substantially at the end of each stroke of the ram.

The invention may be briefly summarized as consisting in certain novel details of construction and combination and arrangement of parts which will be described in the specification and set forth in the appended claims.

In the accompanying sheets of drawings, wherein I have shown one embodiment of the invention to which I am not necessarily confined, however, Figure 1 is a side view of the machine with parts in section, the reciprocating ram being retracted and slightly elevated; Fig. 2 is a detached view of the rocking cradle and ram with the ram extended, this view showing portions of the two motors for shifting the ram; Fig. 3 is a top plan view of the machine; Fig. 4 is a transverse section substantially along the line 4—4 of Fig. 1; Fig. 5 is a transverse sectional view through the ram and cradle, the section being taken substantially along the line 5—5 of Fig. 1, looking in the direction indicated by the arrows; Fig. 6 is a transverse sectional view through the outer portion of the cradle and ram, the section being taken substantially along the line 6—6 of Fig. 1; Figs. 7, 8 and 9 are diagrammatic views illustrating the manner in which the ground wheels can be turned to shift the front and rear ends of the machine in order that the latter may be quickly and easily brought up to, or positioned with respect to the material to be shifted or loaded and with respect to the receiving cars for the material.

The machine includes a frame 10 which is preferably rectangular in shape and may be formed chiefly from structural material. This frame is supported on combined driving and steering front and rear ground wheels, the front wheels being designated 11 and the rear wheels 12. As will be explained presently, power may be applied to either the front wheels or rear wheels, or both, for propelling the machine, and both the front and rear wheels may be turned at right angles or to any desired angle to their normal positions so that the machine as a whole can be steered very readily, and the front and rear ends turned to any points without requiring any turning space other than that which is occupied by the machine itself. These wheels are preferably broad rimmed wheels designed to travel on the ground or mine floor without the necessity for track rails.

The machine is preferably propelled by power, and for this purpose I mount on the rear end of the frame a motor 13, which may be, and preferably is an air motor which rotates a forwardly extending shaft 14, which is designed to drive through suitable gearing either the front or rear wheels, or both. In this instance, the shaft 14 is provided with a pinion 15, meshing with a gear 16, concentric with which is a forwardly extending shaft 17 and a rearwardly extending shaft 18. The shaft 17 is designed to be clutched to the gear 16 by clutch members 19, one of which is slidable on the shaft 17. This shaft 17 is connected by worm and worm wheel gearing 20 to the front axle 21, while the rear shaft 18 can be similarly clutched to the gear 16, and in a similar manner drives the rear axle 22 by worm and worm wheel gearing, not shown, but similar in all respects to the gearing 20. Thus it will be seen that the motor 13, through the mechanism described, may propel the machine along the ground or through a passageway of a mine, utilizing either the front or rear wheels or both the front and rear wheels as driving wheels.

The ground wheels are not mounted directly on the front and rear axles, but on knuckles 23, each including an upright spindle 24, journaled in a casting 25 which is secured to the frame of the machine and constitutes also a bearing for the corresponding axle, as shown particularly in Fig. 4. Power is transmitted from each axle to the corresponding front or rear wheels, through bevel gearing, including a bevel gear 26, keyed to the end of the axle, a bevel gear 27 turning loosely on the spindle 24 and a bevel gear 28 which is driven by gear 27, and which turns freely on the outwardly projecting or wheel supporting spindle of the knuckle. The ground wheel is keyed or otherwise secured to this bevel gear 28, so that said ground wheel will turn with the gear.

The upright steering spindles 24 of the knuckles 23, may be turned to turn the front and rear wheels in pairs, by two steering shafts 29 which extend across the machine as shown by full and dotted lines in Fig. 3, just at the rear of the front and rear axles. These steering shafts 29 are provided with hand-wheels 30, by which they may be turned, and with worms 31, which mesh with worm wheels 32, which are secured to the upper ends of the knuckle spindles 24. The construction is such that either the front or the rear wheels may be turned in pairs in either direction, and to any position including a position at right angles to normal position, so that said wheels can be made to stand in planes at right angles to the longitudinal axis of the machine as illustrated in Figs. 7 and 8, thus permitting the machine to be turned or moved about in an exceedingly small space.

Supported on the main frame 10 is an upwardly inclined conveyer frame 35, the lower end of which is below and some distance in advance of the frame 10, the upper rear end being above and some distance at the rear of the frame 10. This conveyer frame 35 is provided with a suitable conveyer, and in this case carries a series of rollers on which runs an endless conveyer belt 36, which is driven by a sprocket chain 37 (see Figs. 1 and 3) passing about a sprocket on a shaft 38 connected by bevel gearing 39 to the main propelling shaft 14 previously referred to.

The material is moved up onto the conveyer by any suitable tool, which in this case is in the form of a hoe 40, mounted on a ram or hoe-shank 41, which is adapted to be moved inwardly or outwardly in a suitable cradle 42, having rollers 43 which are engaged by, and which support the ram. This cradle is formed in part by the cylinder 44 of a reciprocating motor which at its rear end is pivoted or trunnioned at 45 onto suitable supporting standards 46, secured to the side members of the conveyer frame. It will be observed by reference particularly to Figs. 2 and 6, that the cylinder 44, forming a part of the cradle, is provided at diametrically opposite sides with laterally projecting webs or flanges 44$^a$, and that the box-like part of the cradle carrying the ram supporting rollers 43, is formed by the cylinder with its flanges, and by side channels 44$^b$, and a bottom cross-plate 44$^c$, (see Fig. 6).

The motor, of which the cylinder 44 is a part, is preferably an air motor provided with a piston, shown by dotted lines in Fig. 1, to which is connected a plunger 47, which is attached to the tool-head 48 at the forward end of the ram. By admitting the air or other motive fluid to opposite sides of the piston, the ram can be moved inwardly and outwardly in the well-known manner.

For the purpose of raising and lowering the ram and cradle I utilize in this case, two vertical reciprocating motors, the cylinders 49 of which, are mounted on the front corners of the main frame 10, and the plungers 50 of which, are connected to the cradle at 51 (see Figs. 1 and 5). With these motors the ram and cradle may be elevated, and while the latter may, if desired, be lowered by power, in this case the hoe and cradle are lowered by gravity when the fluid is exhausted from beneath the piston in the cylinders 49.

In order that the material may be moved rapidly onto the conveyer belt, I have provided what may be termed an automatic reverse for the ram, and a novel coaction or coöperation between the elevating motors and forwardly and rearwardly reciprocating motor. To this end I have provided for the motors referred to, a valve 55, which is arranged at the forward end of the ram, as will be seen particularly by reference to Fig. 1. The valve casing has connected to it, inlet and exhaust pipes, and in addition a pipe 56, leading to the rear end of the motor cylinder 44, and provided with a branch 57 leading to the lower end of each upright cylinder 49. In Fig. 1 I have shown the branch leading to one of these cylinders, but it will be understood that a similar branch pipe will extend to the other upright cylinder 49 at the opposite front corner of the machine. The valve casing has connected to it also, another pipe 58 (shown at the left hand end of Fig. 1) leading to the forward end of cylinder 44. This valve is shifted by a valve lever 60, which projects on both sides of the center of the valve casing, and at its lower end is provided with a laterally projecting toe 61. This toe extends through an arc-shaped slot 62 in one of the side plates 45 of the cradle, so that on the return stroke of the ram a fixed stop 63, near the forward end of the ram 41, will engage the toe and shift the valve lever to the position shown in Fig. 1 so as to reverse the ram movement when the piston in cylinder 44 reaches the end of its stroke. Another stop 64, which is adjustably mounted in the slot 64ª of the ram and likewise in the path of movement of the toe 61, engages the latter near the end of the forward stroke of the ram and swings the valve lever to the position shown in Fig. 2, thus reversing the movement of the ram when the piston in cylinder 44 reaches the forward end of the cylinder. It will be noted that when the valve lever is moved to the position shown in Fig. 1, the motive fluid is exhausted from in front of the piston in cylinder 44, and at the same time the motive fluid is admitted to the rear end of the cylinder 44, and to the lower ends of the elevating cylinders 49, so that simultaneously the ram is moved outwardly and the cradle and ram are swung upwardly, and when the valve lever is automatically shifted to the position shown in Fig. 2, the motive fluid is simultaneously exhausted from the cylinders 49 and from the rear side of the piston in cylinder 44, and at the same time the motive fluid is supplied to the front side of the piston in cylinder 44. This causes the ram and cradle to drop, and at the same time causes the retraction of the ram. When this takes place, the hoe sinks into the material and moves the same rearwardly up onto the conveyer belt. This cycle of operations is repeated with rapidity and takes place as before stated, wholly automatically. If it is desired to manually operate the valve controlling the flow of motive fluid to and from the cylinders 44 and 49, the valve lever 60 will be loosened and will be slid upwardly a sufficient distance so that the toe will clear the stop members 63 and 64.

This valve mechanism though operated automatically in the normal operation of the machine, allows a certain degree of manual control in order that a valuable characteristic of the machine may be brought into play, namely, the variability of the forward stroke. In the use of this machine the operator will generally stand alongside the moving ram, and when it is desired that the ram have its full forward stroke, he will allow the valve to be actuated automatically, but when he wishes a shorter forward stroke he will manually shift the valve by grasping the upper part of the valve lever 60, or by allowing this part of the valve lever to strike his hand so it will be swung to reversing position. In other words, he can perform by hand, just what is done automatically in the normal operation of the machine, and can thereby make the forward stroke anything desired within limits of the machine.

As the material is removed from in front of the machine the latter can either be advanced or moved sidewise so as to be properly positioned with respect to the point of discharge and point of receiving the material. This can be done very readily because of the swivel mounting of the front and rear ground wheels which can be positioned to permit the machine, or the front or rear end of the machine to be moved to just the desired position. As illustrated in Figs. 7 and 8, either the front or rear wheels can be turned at a complete right angle to normal position, and it should be noted that power can be applied to the front or rear ground wheels regardless of the positions to which they may be turned by the steering shafts 29 and hand-wheels 30. The advantage of this feature is illustrated clearly in Fig. 9, wherein A indicates the machine in outline, B the loosened material to be loaded, C and C′ empty cars on separate branches of a track D. The machine is shown by full lines in position to load in a diagonal direction into one of the cars C, and when this car is loaded the machine can be quickly turned to the position shown by dotted lines at A′, so as to load into the other car C′. Thus the loading is not interrupted by the switching of the loaded and empty cars, and the position of the machine can be quickly and easily changed so as to properly position both the receiving and discharge ends of the machine by turning both sets of ground wheels, and applying power to both sets so as to turn the front end of the machine in one direction and the rear end in the opposite direction.

Having thus described my invention, what I claim as new and desire to secure by Letters Patent is:

1. In a loading machine, a frame; a ram supported by the frame for reciprocating movement forwardly and rearwardly and for reciprocating movement vertically; a pair of motors for elevating and for moving the ram inwardly and outwardly; and a single valve controlling both motors.

2. In a loading machine, a frame; a ram movable inwardly and outwardly and provided with a material moving tool; motive means for shifting the ram; and means automatically reversing the direction of the ram at the end of each stroke, said means comprising mechanism by which the forward stroke may be varied, and any forward stroke terminative manually.

3. In a loading machine, a frame, a ram movable inwardly and outwardly and provided with a material moving tool, a motor for shifting the ram, a motor controlling element, and means automatically shifting said element to cause the motor to reverse the direction of the ram at the end of each stroke.

4. In a loading machine, a frame, a material moving tool, a ram carrying the same and supported by the frame, the ram being mounted for reciprocating movement inwardly and outwardly and for movement vertically, a motor for shifting the ram vertically, and means automatically causing the actuation of said motor at the end of each inward stroke of the ram.

5. In a loading machine, a frame; a material moving tool; a ram carrying the same and supported by the frame, the ram being mounted for reciprocating movement inwardly and outwardly with respect to the frame; a motor for shifting the ram; and means automatically changing the direction of movement of the motor at the end of each stroke of the ram.

6. In a loading machine, a frame; a material moving tool; a ram carrying the tool and mounted for movement vertically, and forwardly and rearwardly; motive means for elevating and for moving the ram forwardly and rearwardly, and automatic means for simultaneously causing the elevating and forward movement of the ram substantially at the end of its rearward stroke, and for causing the lowering of the ram and a rearward movement substantially at the end of its forward stroke.

7. In a loading machine, a frame; a material moving tool; a reciprocating ram supporting the same, the ram being mounted for swinging movement vertically and for forward and rearward reciprocating movement; a motor for elevating the ram; a motor for moving the ram forwardly and rearwardly; and mechanism for automatically causing the ram to be elevated and moved forwardly substantially at the end of its rearward stroke, and to be lowered and moved rearwardly substantially at the end of its forward stroke.

In testimony whereof, I hereunto affix my signature in the presence of two witnesses.

FRANK BILLINGS.

Witnesses:
E. B. GILCHRIST,
L. I. PORTER.